Patented Dec. 6, 1932

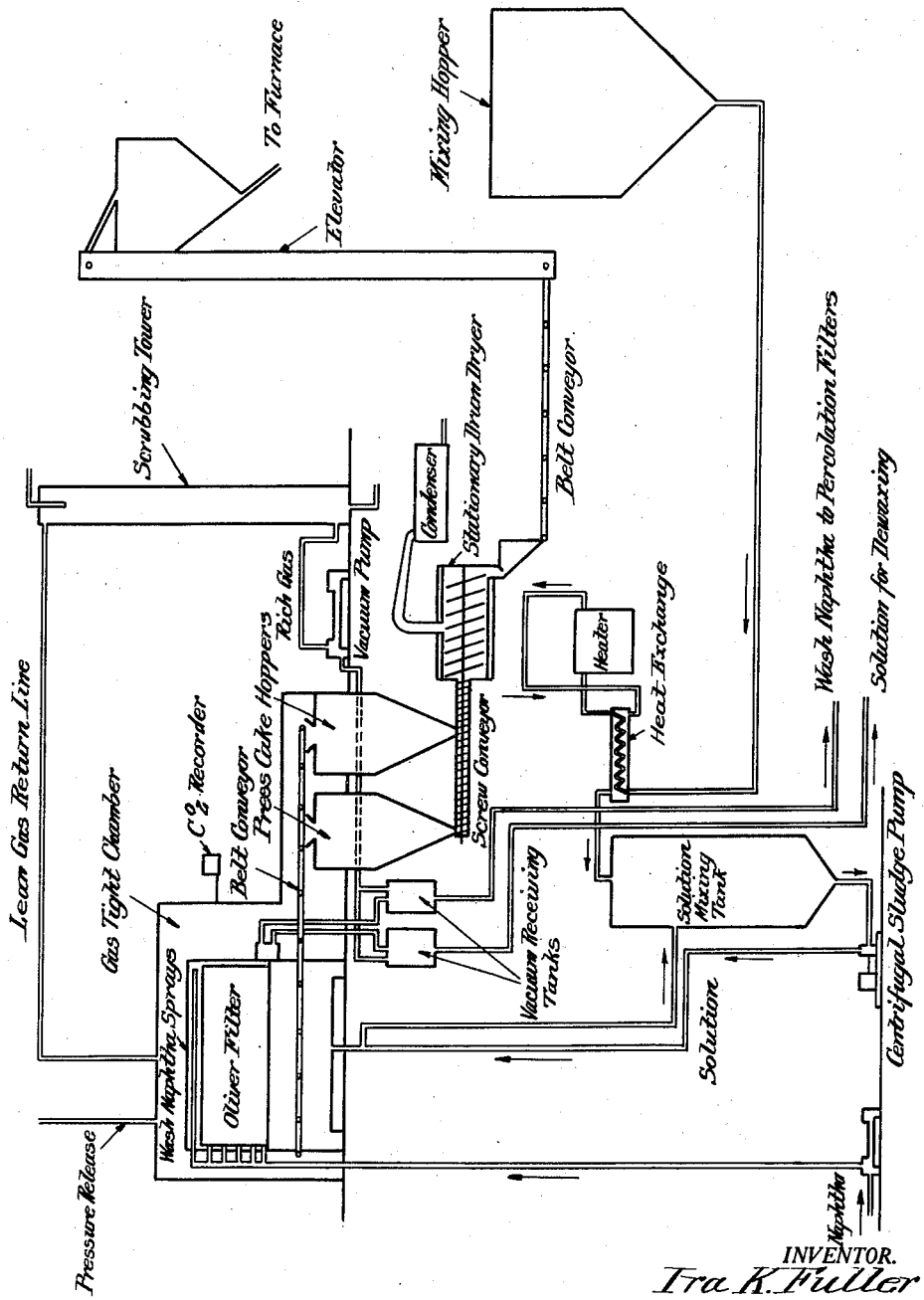

1,890,284

UNITED STATES PATENT OFFICE

IRA K. FULLER, OF OLEAN, NEW YORK, ASSIGNOR, BY MESNE ASSIGNMENTS, TO CONTACT FILTRATION COMPANY, A CORPORATION OF CALIFORNIA

PROCESS OF TREATING SPENT ADSORBENTS

Application filed September 27, 1929. Serial No. 395,594.

The present invention relates to a method of treating spent adsorbents which have been employed in the decolorization of oils. The decolorization of oils by mixing an activated adsorbent material therewith and heating the mixture to effect the decolorization of the oil is well known. In accordance with this well known process, the hot mixture of oil and adsorbent, such, for example, as a so called "clay", is subjected to filtration, whereby the adsorbent is separated from the oil and collected for reactivation.

The clay is reactivated by removal of the adsorbed coloring matter, which is of a gummy or resinous nature, either by the use of suitable solvents, or by heating the clay to burn the adsorbed matter. In either case it is customary to remove the oil remaining in the clay prior to the reactivation, both for the sake of economy and also, where reactivation is by burning, to avoid the accumulation, in the clay, of residues from burnt oil.

The purpose of the present invention is to remove the oil as completely as practicable, and to do so with maximum economy, particularly in the volume of solvent used for the purpose. I have found that this may be accomplished by a process in which the spent clay is first mixed thoroughly with enough oil solvent, such as gasoline, to make a dilute solution with the oil which has been retained by the clay, the clay is then filtered out of the mixture, thus forming a filter cake containing only a small quantity of dilute oil solution, this filter cake is then washed with a relatively small additional quantity of solvent which is percolated through it to remove such dilute oil solution, and the clay is then dried to remove the practically pure solvent retained by it.

The accompanying drawing is a flow sheet illustrating a plant for carrying out this process.

Starting on the flow sheet with the mixing hopper, the spent adsorbent is mixed with the solvent to be employed, which is preferably and conveniently straight run gasoline, that is, gasoline of low aromatic content, such as is obtained from Pennsylvania crude. The mixture of spent adsorbent, hereinafter referred to as "clay", and the solvent are passed to a heater, by way of a heat exchanger, which preheats the incoming mixture through thermal contact with the heated mixture issuing from the heater. This heater is conveniently a tube still, although there may be employed any other type of heater in which the mixture of clay and solvent may be continuously agitated during the heating. As the hot mixture of solvent and clay issues from the heater, it passes through the heat exchanger in thermal contact with the incoming mixture, and the hot mixture from the heater is thereby cooled to a temperature safe to handle. From the heat exchanger the cooled clay-solvent mixture passes to an agitating or solution-mixing tank where the mixture, containing less than about 40% of oil, is further agitated. The clay-solvent mixture has been cooled in the heat exchanger so that the material will have a temperature of about 120° to 130° F., which will insure the wax content of the oil being in solution.

The material consisting of the spent clay, together with the gasoline solution of the oil originally contained in the clay which is hereinafter referred to as simply the "solution", is now conducted to a filter-press of standard construction, the type designated on the drawing being known as the "Oliver" press, although any type may be employed. The "Oliver" press comprises a tank or liquid-tight receptacle, in which is placed a revolving drum carrying the filter cloth, the drum being so positioned that it is partially immersed in the liquid being filtered. The drum is divided into a number of compartments and is connected with a vacuum in such manner that the compartments will be successively exhausted and the liquid drawn through the filter cloth by the suction, the solid matter originally suspended in the liquid being deposited on the exterior surface of the drum as a cake, which is removed by a stationary scraper mounted adjacent the drum. It will be understood that this filter-press is a standard type and forms no part of the present invention. If the press is provided with a two filtrate valve, it is possible to wash the deposited cake and obtain the filtered liquid and wash liquid in separate streams. Valves of this type are well known and are of standard construction.

In the filter the clay is collected continuously in a layer or cake which is raised from the mixture in the bottom of the tank and partially dried by the effect of suction within the drum. At this point the cake is sprayed with straight run gasoline as a wash. Preferably, there should be a plurality of sprays, which should be very fine and arranged in rows so that only a small amount of gasoline is applied at one time.

The rows should be spaced so that the gasoline from a previous spray just disappears from the cake. The spraying preferably continues at least through 90° rotation of the drum, and possibly longer, leaving only a section great enough to permit the drying of the cake so that it may be readily scraped off. The wash solution passes out through the valve separate from the original solution to a separate vacuum receiving tank, and may be used as a diluent either in a percolation filtration or in the first step of the present process.

The press cake, substantially free from oil is continuously scraped from the rotating filter drum, and conveyed to hoppers. From these hoppers it is taken to a dryer, which preferably is of a stationary drum type, and heated by steam or some other convenient source of heat. The vapors from the dryer are condensed and the residual gasoline in the cake thus recovered.

The dried clay, discharged from the dryer through a suitable hopper or valve to trap any vapor, is ready for reactivation. This may be done in the usual manner by heating in a furnace, or reactivation may be made by further treating the clay with special solvents adapted to remove the gums and other foreign matter from the clay. Among the solvents suitable for this purpose are benzol, or benzol containing methyl-ethyl ketone.

To reduce gasoline losses and to permit the handling of vapors, the press, conveyors, and the top of the press cake hoppers are enclosed in a vapor-tight chamber or room.

What I claim as my invention and desire to secure by Letters Patent is:

1. The process of treating spent adsorbent from an oil-contacting operation, which comprises mixing the adsorbent with a relatively large quantity of oil solvent, filtering the adsorbent from the mixture, and then passing, through the filter cake so formed, a relatively small amount of solvent to remove the remaining dilute oil solution.

2. The process of treating spent adsorbent from an oil-contacting operation, which comprises mixing the adsorbent with a relatively large quantity of oil solvent, heating the mixture, filtering the adsorbent from the mixture, and then passing, through the filter cake so formed, a relatively small amount of solvent to remove the remaining dilute oil solution.

3. In the treatment of oil with an activated adsorbent, the process which comprises adding, to a mixture of spent adsorbent and oil, a diluent of the oil which is substantially ineffective as a solvent for the resinous coloring matter adsorbed by the adsorbent, in a volume greater than that of the oil, filtering the adsorbent from the dilute oil solution, and percolating, through the filter cake so formed, a relatively small further quantity of similar diluent to remove the dilute oil remaining therein.

IRA K. FULLER.